US00RE35400E

United States Patent [19]

Stacher et al.

[11] E Patent Number: Re. 35,400

[45] Reissued Date of Patent: Dec. 17, 1996

[54] RAPIER LOOM HAVING PICKING TAPES AND SPACERS

[75] Inventors: Angelo Stacher, Arbon; Rudolf Vogel, Grüt, both of Switzerland

[73] Assignee: Sulzer Brothers Limited, Winterthur, Switzerland

[21] Appl. No.: 282,128

[22] Filed: Jul. 28, 1994

Related U.S. Patent Documents

Reissue of:

[64] Patent No.: 5,135,033
Issued: Aug. 4, 1992
Appl. No.: 667,972
Filed: Mar. 12, 1991

[30] Foreign Application Priority Data

Mar. 13, 1990 [CH] Switzerland ..... 00800/90

[51] Int. Cl.[6] ..... D03D 47/18; D03D 49/60

[52] U.S. Cl. ..... 139/449; 139/188 R; 139/446

[58] Field of Search ..... 139/449, 188 R, 139/446

[56] References Cited

U.S. PATENT DOCUMENTS

| | | | |
|---|---|---|---|
| 2,538,630 | 7/1948 | Rusnov . | |
| 3,299,911 | 1/1967 | Dewas | 139/449 |
| 3,842,869 | 10/1974 | Champagne | 139/188 R |
| 4,638,839 | 1/1987 | Pezzoli | 139/449 |
| 4,653,545 | 3/1987 | Riesen | 139/188 R |
| 4,977,932 | 12/1990 | Pezzoli | 139/449 |
| 5,088,525 | 2/1992 | Zimmermann . | |

FOREIGN PATENT DOCUMENTS

| | | | |
|---|---|---|---|
| 2552455 | 3/1985 | France | 139/446 |
| 2902729 | 2/1980 | Germany | 139/449 |
| 3519685 | 8/1986 | Germany | 139/449 |
| 899476 | 6/1962 | United Kingdom . | |

*Primary Examiner*—Andy Falik
*Attorney, Agent, or Firm*—Townsend and Townsend and Crew LLP

[57] ABSTRACT

A rapier loom has rapier heads which are moved by picking tapes into an open shed. Spacing elements are provided for the rapiers to ensure that when the shed is fully opened, a space is present between the tape and the bottom shed to reduce frictional contact between the warp yarns and the picking tape edges when the shed closes. The spacing elements can be in the form of slidable members which are disposed on the underside of the rapier head and/or in the form on spacing teeth which are secured to the sley and which can enter the shed between the warp yarns of a bottom shed.

16 Claims, 2 Drawing Sheets

RAPIER LOOM HAVING PICKING TAPES AND SPACERS

Matter enclosed in heavy brackets [ ] appears in the original patent but forms no part of this reissue specification; matter printed in italics indicates the additions made by reissue.

This invention relates to a rapier loom having picking tapes and spacers.

As is known, rapier looms have been constructed with a giver rapier for picking a weft yarn into a central zone of a shed of warp yarns and a taker rapier for taking over the weft yarn to complete a picking operation. In contrast to projectile looms in which the shed remains open throughout picking, in rapier looms, the closure movement of the shed starts during a relatively slow withdrawal movement of the rapiers.

It has also been known that the rapiers include a head for holding a yarn and an elongated tape to which the head is secured at one end with the tape being wound about a tape wheel. In addition, it has been known to provide a sley race for guiding the rapiers. Thus, during the withdrawal movement of the rapiers, the warp yarns come to rest on the sley race and the rapiers come to slide by way of the tapes on the support formed by the warp yarns and the sley race. As a result, the warp yarns of the bottom shed are then deflected around the tape edge near a reed which extends from the sley with a grazing action so that the tape edge wears. In turn, the damaged tape edge rubs on the warp yarns and damages the warp yarns.

U.S. Pat. No. 3,842,869 describes a tape guide race way for a rapier loom in which an elongated body portion is mounted on a loom lay to provide a raceway in which a picking tape is guided. However, because of the positive guidance of the picking tape during picking, the body portion must remain in place until the picking tape has been withdrawn from an open shed. That is to say, the reed which is mounted on the lay cannot be moved without effecting the guidance of the picking tape.

Accordingly, it is an object of the invention to reduce a frictional action between the warp yarns and a picking tape in a rapier loom.

It is another object of the invention to reduce damage caused by rapier tapes on warp yarns in a rapier loom.

It is another object of the invention to prevent a rapier from coming into contact with the warp yarns of a bottom shed of a rapier loom.

Briefly, the invention is directed to a rapier loom which includes a sley having a reed therein for passage of a top shed of warp yarns and a bottom shed of warp yarns therethrough, at least one picking tape for reciprocation transversely between the top and bottom sheds of warp yarns and a rapier tread secured to one side of the tape for passage between the sheds in order to convey a weft yarn therewith.

In one embodiment, a sliding member is secured to a bottom side of the rapier tape from the rapier head in order to space the yarns of the bottom shed from the tape a predetermined distance when the shed is open. This distance is at lest greater than one-half the height of the rapier head above the tape. In addition, a common center of gravity of the head, sliding member and tape is disposed in the plane of the tape.

In anther embodiment, a plurality of spacing teeth are secured to the sley in order to project through the bottom shed of the warp yarns when the shed is open. Each tooth is also provided with a flat, uninterruped upper surface which extends parallel to the warp yarns of the bottom shed for slidably supporting the picking tape thereon.

The spacing teeth have similarities with guide teeth such as described in German OS2439802 but with a fundamental difference in that the upper surfaces of the spacing teeth are uninterruped, i.e., have no projection for guiding a rapier head and/or picking tape.

The invention thus provides two different solutions to the problem of having the picking tape interfere with the bottom shed warp yarns both based upon the use of spacers. That is to say, one solution is to maintain a spacing between the tape and the bottom shed by means of sliding members on the underside of the rapier heads while the second solution uses spacing teeth which are secured to the sley and which maintain the desired spacing by extending through and between the warp yarns of the bottom shed.

Conventional rapier looms in which the tapes slide on the warp yarns of the bottom shed can readily be converted in line with one or the other or both of the two solutions according to the invention. In any such conversion, the bottom shed must be lowered relative to the two tape wheels for raciprocating the picking tapes to ensure at least a substantially constant spacing between the tape and the bottom shed. The tapes are made of a flexible material but are sufficiently rigid to have little sag—in the case of rapier heads having sliding members—between the tape wheel and the rapier head even when the rapier has fully entered the shed.

The center of gravity of the head of conventional rapiers is disposed far above the plane in which the tape moves and engages the head. Consequently, during the entry movement, a torque is produced which produces a difficulty controllable movement of the rapier head with a tendency to lift. Placing the sliding members on the underside of the heads shifts the center of gravity towards the tape pine so that the tendency to lift is reduced or possibly even eliminated when the common center of gravity of the rapier head and the sliding member is shifted into the plane of the tape. As material for the sliding members there can be chosen, for example, an abrasion-resistant plastics or a metal alloy.

In the spacing teeth embodiment, the tapes as well as the rapier heads are supported. In this case, too, it is possible to omit the warp yarn support which in conventional rapier looms must be disposed between the reed and the shifts to ensure that the warp yarns test uniformly on the sley race. The omission of the warp yarn support enables the angle of the open shed to be increased. Such an increase is advantageous for fibrous yarns which tend to stick to each other—i.e., adjacent warp yarns, one of which has to enter the top shed and the other the bottom shed, stick to one another because of the fibers projecting from the yarns. The further the shed can open, the better do the sticking warp yarns disengage from one another. Sticking warp yarns are a nuisance since they may cause warp yarn breakages or mis-picks of the weft yarn.

The operative feature of the invention, viz. that a spacing is present between the picking tape and the bottom shed, is particulary advantageous for warp yarns consisting of filament yarns because the friction caused by damaged tapes of such yarns leads rapidly to warp yarn breakages.

These and other objects and advantages of the invention will become more apparent from the following detailed description taken in conjunction with the accompanying drawings wherein.

Figure 1:
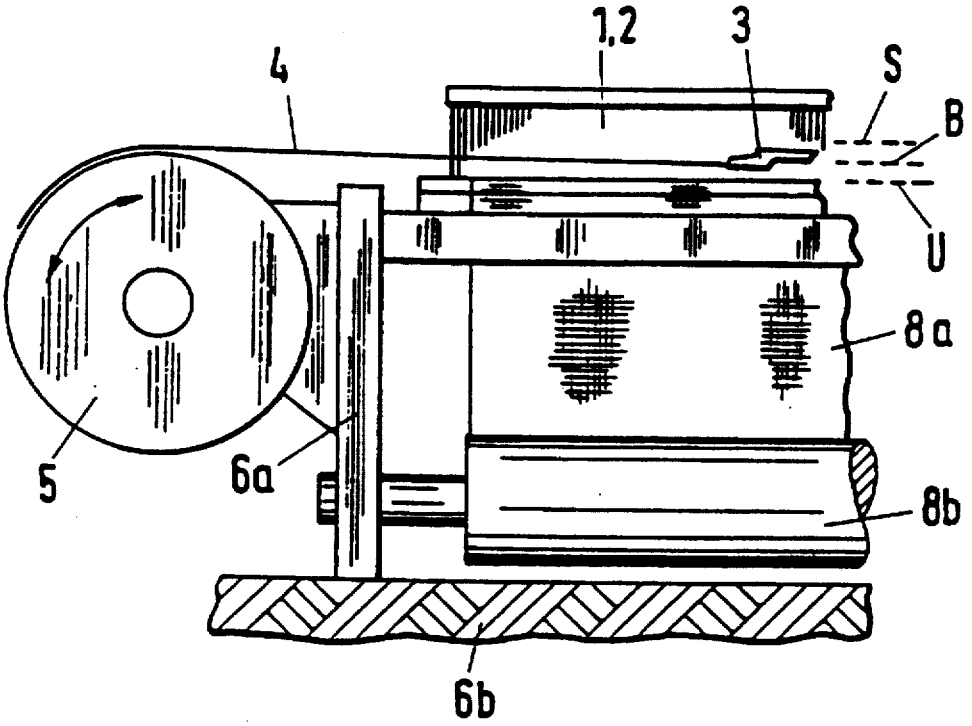
FIG. 1 illustrates a side view of one-half of a rapier loom as seen from the cloth end.

Referring to FIG. 1, the rapier loom is of generally conventional structure and includes a sley having a reed 2 thereon for passage of a top shed of warp yarns (not shown) and a bottom shed of warp yarns (not shown) therethrough. In addition, a rapier head 3 is secured to one end of a picking tape 4 which, in turn, is secured to a tape wheel 5 in any known manner so as to reciprocate the rapier head 3 transverely between the top and bottom sheds of warp yarns. As indicated the tape wheel 5 is mounted on a loom frame 6a which in turn is supported on a floor 6b and which, in turn, rotatably supports a cloth beam 8b on which cloth 8a is wound.

Figure 2:
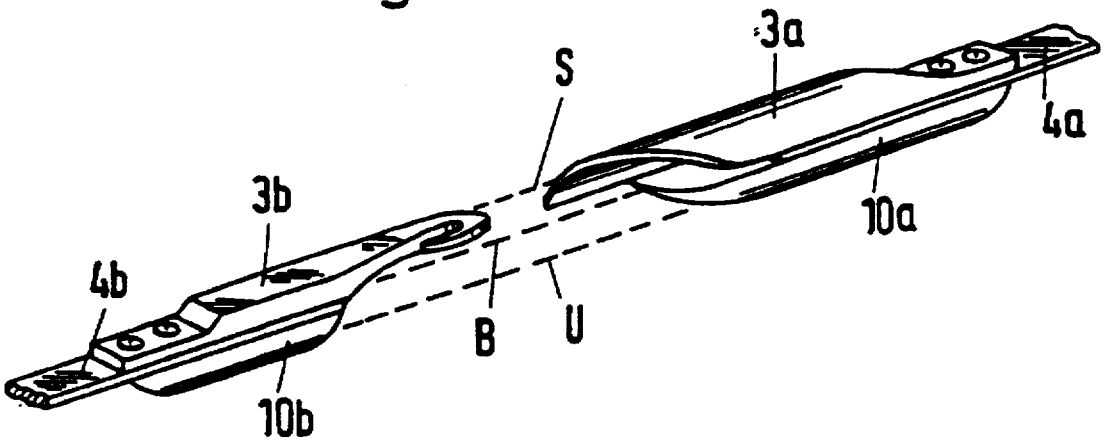
FIG. 2 illustrates a perspective view of a pair of rapier heads having sliding members in accordance with the invention.

As indicated in FIG. 1, the rapier head 3 has three vertical positions indicated by chain lines S, B, U. The chain line S denotes the apex height of the giver rapier head which is not shown in FIG. 1; the chain line B denotes the plane of the tape 4; and the chain line U denotes the position of the bottom shed when the shed is fully open. In conventional rapier looms without guide teeth, the chain lines U and B virtually coincide. Referring to FIG. 2, each of a giver rapier head 3 a and a taker rapier 3b is provided with a sliding member 10a, 10b, respectively. As indicated, each sliding member 10a, 10b is secured to the underside of a tape 4a, 4b opposite the rapier head 3a, 3b. In the relative positions illustrated, the two rapier heads 3a, 3b are shown shortly before the transfer of the weft yarn from the giver rapier head 3a to the taker rapier head 3b. In addition, the three vertical positions denoted by the chain lines S, B, U are disposed in a verticle plane passing through the center of the tapes 4a, 4b. The chain line U coinsides with the bottom surfaces of the sliding *member* 10a, 10b. Neglecting tape thickness, the distance between the chain lines B and U is equal to a predetermined distance at between the tape and the bottom shed while the distance between the chain lines B and S is equal to the height of the rapier head 3a above the tape 4a. In this regard, the distance a is at least half the height of the rapier head 3a above the tape 4a. Further, the head 3a, 3b, sliding member 10a, 10b and tape 4a, 4b have a common center of gravity, respectively, which is disposed in the plane of tape 4a, 4b.

During operation, as the respective rapier head 3a, 3b is withdrawn from the open shed, and as the shed begins to close, the sliding members 10a, 10b serve to space the yarns of the bottom shed from the respective tapes 4a, 4b a predetermined distance a. Thus, the respective tape 4a, 4b is positively spaced from the yarns of the bottom shed so as to avoid frictional contact therebetween.

Figure 3:
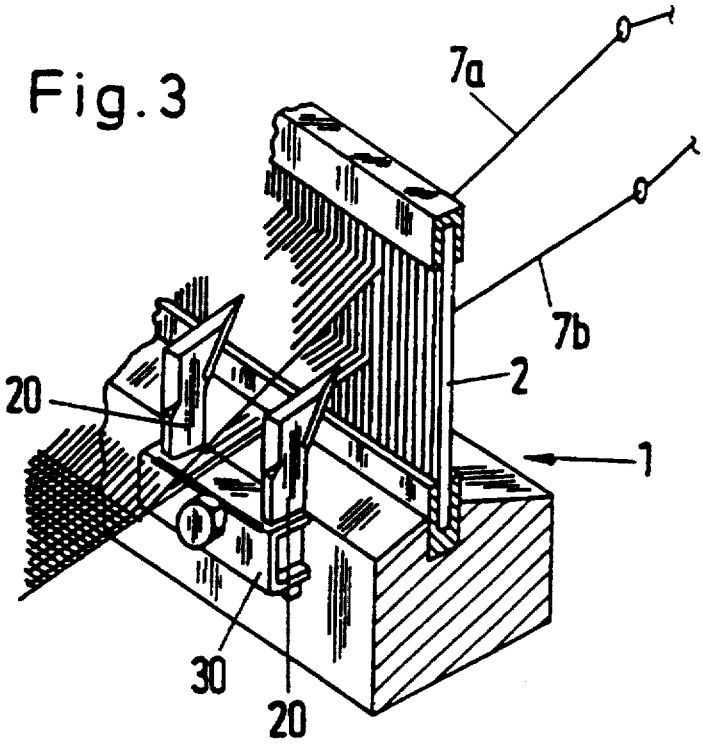
FIG. 3 illustrates an embodiment employing spacing teeth on a sley of a rapier loom in accordance with the invention.
Figure 4:
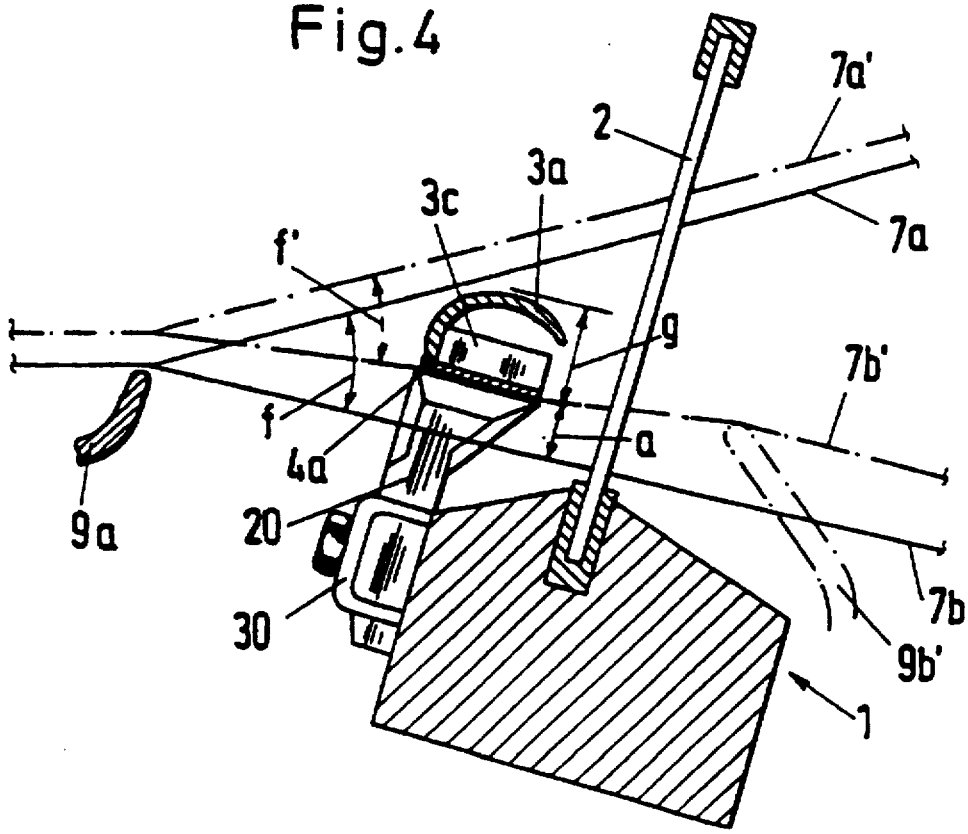
FIG. 4 illustrates a cross-sectional view through a shed and a sley having spacing teeth for guiding a rapier tape and head in accordance with the invention.

Referring to FIGS. 3 and 4 wherein like reference characters indicate like parts as above, a plurality of spacing teeth 20 are secured to the sley 1 in order to project through the bottom shed of warp yarns 7b. As indicated, securing elements 30 which may be releasably secured to the sley 1 by suitable means, as by bolts, are used to mount the spacing teeth 20 on the sley 1. As indicated in FIG. 3, each securing element 30 is of U-shape and is formed with slots to mount a pair of spacing teeth 30 on the sley 1. The number of spacing teeth 20 per securing element 30 nead not, of course, be exactly two as shown in FIG. 3.

Referring to FIG. 4, each spacing tooth 20 extends into the shed bounded by the top shed warp yarn 7a and the bottom shed warp yarn 7b. In addition, in order for the warp yarns 7b to readily pass between the teeth 20 when the shed opens, the sides of each tooth 20 are beveled at the top. As indicated, each tooth 20 has a flat, uninterruped upper surface which extends parallel to the warp yarns 7b of the bottom shed for slidably supporting a tape 4a thereon. In addition, each tooth 20 is spaced a predetermined distance a from the bottom shed when the shed is in the opened position during picking of a weft yarn. This distance a is at least greater than one-half of the height g of the rapier head 3a above the tape 4a. As indicated, the rapier head 3a may have internal components such as a yarn clamp shown diagrammatically as a box 3c.

As indicated in FIG. 4, a cloth support 9a is provided near the apex of the shed for supporting the cloth which is formed. In a conventional rapier loom, a further warp yarn support 9b', would be provided to raise the bottom shed warp yarns 7b', to the chain-dotted line position. However, in the present case, such a warp yarn support is eliminated and the cloth support 9a can be lowered along with the shaft positions. As previously stated, the spacing a is the distance at which the bottom shed is shifted downwardly relative to the tape plane. The warp yarns 7a' of the top shed then shift down in the same manner as the warp yarns in the bottom shed. However, since the warp yarn support 9b is eliminated, the shed angle f' becomes a larger angle f. This increased shed opening lessens the problem of fibrous yarns sticking together.

The spacing teeth 20 are disposed so that the picking tape 4a can slide over the teeth in an uninhibited manner. This is in contrast to guide teeth which have been employed in previous rapier looms for guiding a rapier head and/or tape. In this respect, since the tape wheels are mounted on the machine frame in a nonmovable manner, if guide teeth are present, the sley must not move for the duration of the picking movement including the duration of the rapier withdrawal movement. This limitation does not apply to the spacing teeth 20 because of the flat, uniterrupted upper surfaces. Thus, relative movement between the rapier and the teeth 20 in the warp direction is possible. Therefore, a simultaneous limited movement of the sley 1 and the rapier 3a, 3b is possible. Furthermore, in the absence of protuberances which might otherwise project from the upper surface of the guide teeth, there is no risk of the warp yarns catching on the spacing teeth 20.

The invention thus provides a relatively simple construction to prevent a rapier picking tape and rapier head from catching on the warp yarns of a bottom shed in a rapier loom during a picking operation.

What is claimed is:

1. In a rapier loom, the combination comprising a sley having a reed therein for passage of a top shed of warp yarns and a bottom shed of warp yarns therethrough;

at least one picking [tape] *member* for reciprocation transversely between said sheds;

a rapier head secured to [one side of] said [tape] *member* for passage between said sheds to convey a weft yarn therewith; and a sliding member *separate of said rapier head and* secured to [an opposite side of] said [tape from said rapier head] *picking member* to space the yarns of said bottom shed from said [tape] *picking member* a predetermined distance when the shed is open.

2. The combination as set forth in claim 1 wherein said distance is at least greater than one-half the height of said rapier head above said [tape] *picking member*.

3. The combination as set forth in claim 1 wherein a common center of gravity of said head, sliding member and [tape] *picking member* is disposed in the plane of said [tape] *picking member*.

4. In a rapier loom, the combination comprising a sley having a reed therein for passage of a top shed of warp yarns and a bottom shed of warp yarns therethrough;

at least one picking [tape] *member* for reciprocation transversely between said sheds;

a rapier head secured to [one side of] said [tape] *picking member* for passage between said sheds to convey a weft yarn therewith; and a plurality of spacing teeth secured to said sley and projecting through said bottom shed of warp yarns, each said tooth having a flat, uninterrupted upper surface *free of projections extending above the flat upper surface over the entire length of the surface and* extending parallel to the warp yarns of said bottom shed for slidably supporting said [tape] *picking member* thereon.

5. The combination as set forth in claim 4 wherein each spacing tooth has beveled sides for entering said bottom shed.

6. The combination as set forth in claim 4 which further comprises a plurality of securing elements secured to said sley, each securing element having at least two of said spacing teeth mounted thereon.

7. The combination as set forth in claim 6 which further comprises means for securing each securing element to said sley.

8. The combination as set forth in [claim] *claim* 4 wherein said upper surface of each spacing tooth is spaced a predetermined distance from said bottom shed during picking of a weft yarn; said distance being at least greater than one-half the height of said rapier head above said [tape] *picking member*.

9. In a rapier loom, the combination comprising a sley having a reed therein for passage of a top shed of warp yarns and a bottom shed of warp yarns therethrough;

a plurality of spacing teeth secured to said sley and projecting through said bottom shed of warp yarns, each said tooth having a flat, uninterrupted upper surface extending parallel to the warp yarns of said bottom shed;

at least one picking [tape] *member* for reciprocation transversely between said sheds;

a rapier head secured to [one side of] said [tape] *picking member* for passage between said sheds to convey a weft yarn therewith; and a sliding member secured to [an opposite side of] said [tape] *picking member* from said rapier head to slide along said upper surfaces of said teeth to space the yarns of said bottom shed from said [tape] *picking member* a predetermined distance when the shed is open.

10. The combination as set forth in claim 9 wherein each spacing tooth has beveled sides for entering said bottom shed.

*11. In a rapier loom, the combination comprising*

*a sley having a reed therein for passage of a top shed of warp yarns and a bottom shed of warp yarns therethrough;*

*at least one picking member for reciprocation transversely between said sheds;*

*a rapier head secured to said picking member for passage between said sheds to convey a weft yarn therewith; and*

*a plurality of spacing teeth secured to said sley and projecting through said bottom shed of warp yarns, each said tooth having a flat, uninterrupted upper surface free of projections extending above the flat upper surface over the entire length of the surface and extending parallel to the warp yarns of said bottom shed for slidably supporting said picking member thereon, to space the yarns of said bottom shed a predetermined distance from said picking member when the shed is open.*

*12. In a rapier loom, the combination comprising*

*a sley having a reed therein for passage of a top shed of warp yarns and a bottom shed of warp yarns therethrough;*

*at least one picking member for reciprocation transversely between said sheds;*

*a rapier head secured to said picking member for passage between said sheds to convey a weft yarn therewith; and*

*a plurality of spacing teeth secured to said sley and projecting through said bottom shed of warp yarns, each said tooth having a flat, uninterrupted upper surface free of projections extending above the flat upper surface over the entire length of the surface and extending parallel to the warp yarns of said bottom shed for slidably supporting said picking member thereon, wherein said upper surface of each spacing tooth is spaced a predetermined distance from said bottom shed during picking of a weft yarn.*

*13. The combination as set forth in one of the claims 1–7 and 9–12 wherein said picking member is a picking tape.*

*14. The combination as set forth in claim 8 wherein said picking member is a picking tape.*

*15. The combination as set forth in claim 11 wherein said upper surface of each spacing tooth is spaced a predetermined distance from said bottom shed during picking of a weft yarn; said distance being at least greater than one-half the height of said rapier head above said picking member.*

*16. The combination as set forth in claim 12 wherein said upper surface of each spacing tooth is spaced a predetermined distance from said bottom shed during picking of a weft yarn; said distance being at least greater than one-half the height of said rapier head above said picking member.*

* * * * *